US005991992A

United States Patent [19]

Green, Jr.

[11] Patent Number: 5,991,992

[45] Date of Patent: Nov. 30, 1999

[54] SNAP-MOUNT FAUCET HANDLE REMOVAL TOOL

[76] Inventor: Robert F. Green, Jr., 607 S. Dwyer Ave., Arlington Heights, Ill. 60005

[21] Appl. No.: 09/061,612

[22] Filed: Apr. 16, 1998

[51] Int. Cl.[6] ...................................................... B23P 19/04

[52] U.S. Cl. ................................. 29/239; 29/267; 29/268; 81/64; 269/131; 269/132

[58] Field of Search ..................................... 294/150, 153, 294/156, 149, 31.2; 81/64, 3.43; 269/130–132, 287; 29/239, 267, 268

[56] References Cited

U.S. PATENT DOCUMENTS

| | | | |
|---|---|---|---|
| 1,505,017 | 8/1924 | Fornelius | 81/64 |
| 2,562,055 | 7/1951 | Miller | 81/64 |
| 3,838,615 | 10/1974 | McFarland et al. | 81/64 |
| 3,872,569 | 3/1975 | Lane . | |
| 3,902,236 | 9/1975 | Deem . | |
| 4,562,758 | 1/1986 | Stirling . | |
| 4,823,453 | 4/1989 | Bartlett . | |
| 5,177,852 | 1/1993 | James . | |
| 5,257,445 | 11/1993 | Mayberry . | |
| 5,606,788 | 3/1997 | Rubino et al. . | |
| 5,617,767 | 4/1997 | Nikoden . | |

*Primary Examiner*—Robert C. Watson
*Attorney, Agent, or Firm*—Niro, Scavone, Haller & Niro

[57] ABSTRACT

A plumber's tool for the removal of snap-mount faucet-type handles without damaging the finish of the faucet handle. The tool includes a support member, a lever handle and a wire that can be secured to both the support member and the lever arm such that the wire can be looped around a snap-mount faucet handle and positioned in the gap between the faucet handle and faucet body. When the lever handle is pivoted and tension is increased, the loop in the pop-off wire is positioned in a gap between the faucet body and the faucet handle, causing the faucet handle to separate from the faucet body without scratching or damaging the finish of the faucet.

12 Claims, 2 Drawing Sheets

SNAP-MOUNT FAUCET HANDLE REMOVAL TOOL

BACKGROUND OF THE INVENTION

Plumbers frequently encounter great difficultly when removing snap-mount faucet handles. This invention relates to a plumbing tool, more particularly, to a snap-mount faucet removal tool that provides for easy removal of snap-mount type faucet handles without damaging the finish of the faucet handle.

Snap-mount faucet handles are typically very difficult to remove by hand. Snap-mount faucet handles are secured in place by a friction bond or locking mechanism between a plastic retaining hub in the faucet and the handle. The bond between the plastic retaining hub and the handle is considerable. It is extremely difficult, if not impossible, to remove the snap-mount faucet handle from the retaining hub by hand or without the use of a leverage enhancing device. To currently remove snap-mount faucet handles, plumbers typically insert a screwdriver in the gap between the base of the faucet and the faucet handle to obtain sufficient leverage to pry the faucet from the plastic retaining hub. This procedure often scratches the finish on the faucet handle, which over time, results in deterioration of the finish of the faucet. A scratched faucet handle cannot be restored and must be replaced. Since the faucet handles typically have expensive finishes such as brass or enamel, replacement of a scratched handle can be quite costly. Moreover, a scratch in the finish of the faucet handle detracts from the aesthetic value of the faucet if not replaced.

The current invention provides for a plumbing tool that will remove the faucet handle from the plastic retaining hub without damaging or affecting the finish of the snap-mount faucet handle.

SUMMARY OF THE INVENTION

The plumber's snap-mount faucet handle removal tool of the present invention provides a sufficient force in the gap between the faucet handle and the base to separate the faucet handle from its plastic retaining hub.

Further object of the invention is to provide a wire coated with a non-abrasive material that will fit in the space between the faucet handle and the faucet base, such that when a force is applied to the coated wire, the wire will protrude into the space and overlap itself, thus creating an upward force on the faucet handle, to separate the faucet handle from the retaining hub.

Still yet another object of the present invention is to provide a faucet handle removal tool that does not scratch or affect the finish of the faucet.

A further object of the present invention is to provide a pivoting lever handle that allows the user to exert a force on a coated wire sufficient to remove the faucet handle from the retaining hub.

Another object of the present invention is to provide a tool that is operated with one hand to allow the user's free hand to hold the snap-mount faucet handle and guide it free of the retaining hub of the faucet.

DESCRIPTION OF THE DRAWINGS

Various other objects, features, advantages and benefits of the present invention will be more fully appreciated from the following detailed description of a preferred embodiment when considered in conjunction with the accompanying drawings, and wherein.

DETAILED DESCRIPTION OF THE PREFERRED EMBODIMENTS

Figure 1:
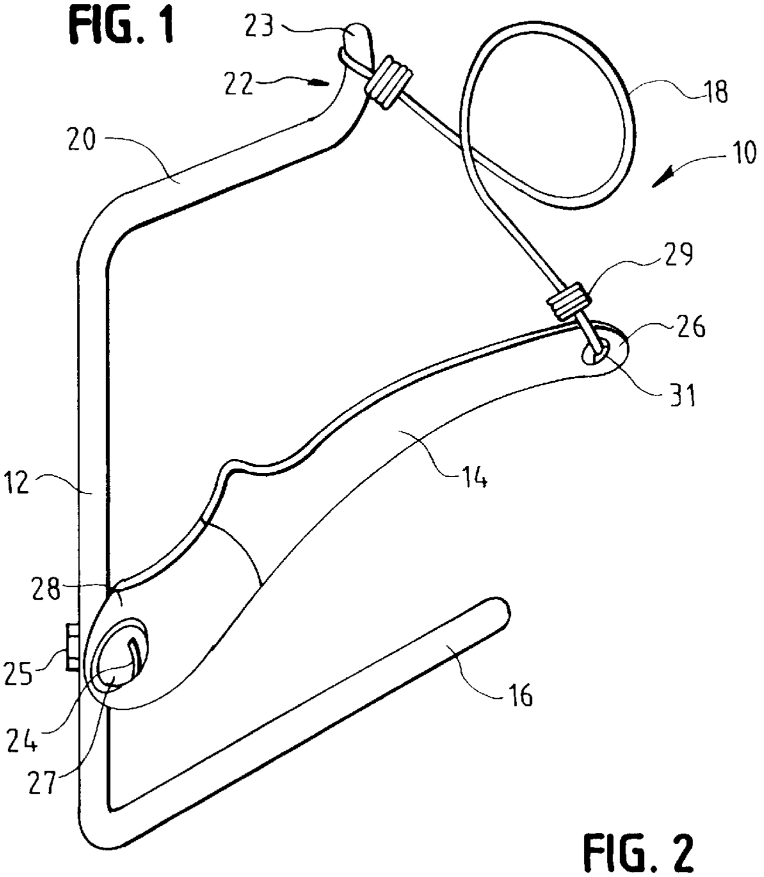
FIG. 1 is the perspective view of an embodiment of the snap-mount faucet handle removal tool of the present invention.
Figure 2:
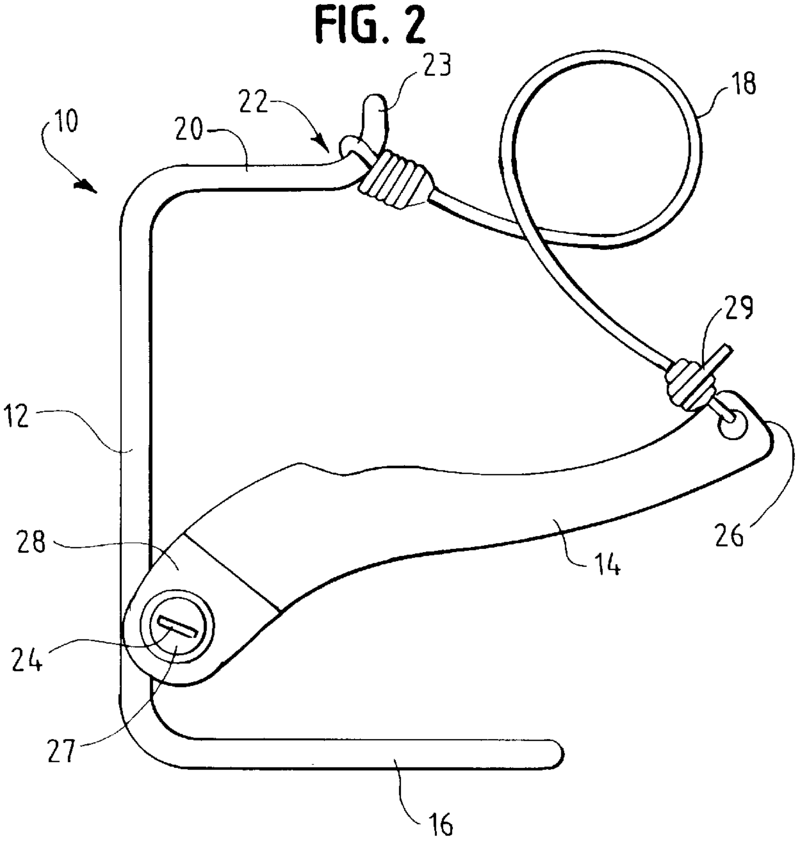
FIG. 2 is a side plan view of the exterior of the snap-mount faucet handle removal tool.
Figure 3:
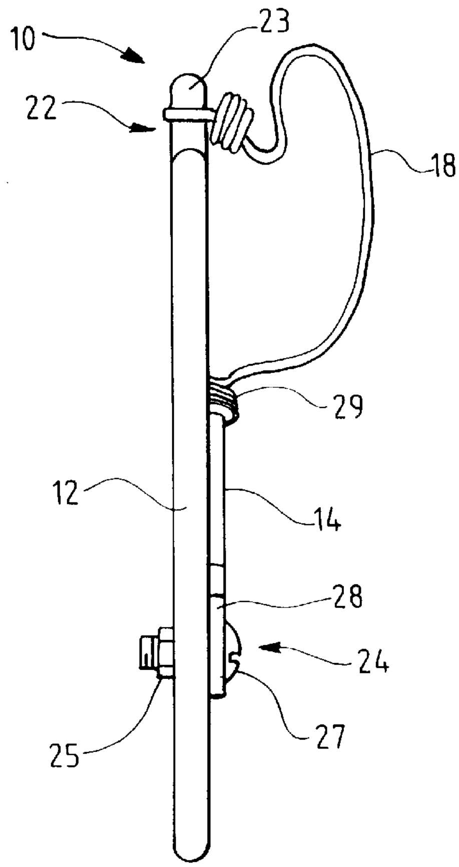
FIG. 3 is a plan view of the snap-mount faucet handle removal tool.

Referring to the drawings, and more particularly to FIGS. 1, 2 and 3, the snap-mount handle removal tool 10 of the disclosed embodiment, has a support member 12, a lever handle 14, a pop-off wire 18 and a pivot 24 which connects the lever handle 14 to the support member 12. The support member 12 consists of a plasticized steel frame that is preferably constructed of steel with a molded plastic coating. Alternatively, the support member 12 may be manufactured of a high-strength plastic material. Preferably the support member 12 is generally C-shaped and has a support arm 20 and support handle 16. The support member 12, support handle 16 and support arm 20 comprise one unitary structure. At one end of the support arm 20 is a support coupling 22. As shown in the preferred embodiment, the support coupling 22 comprises of a hook 23, but may be comprised of any number of coupling means, including a tie, hold down, latch, clamp or the like.

The snap-mount faucet handle removal tool 10 also has a lever handle 14 that is preferably made of a molded plastic coated steel, but may be made of any suitable material. The lever handle 14 is connected to the support member 12 by means of pivot mount 24. The pivot mount 24 of the preferred embodiment comprises a hinged-type connector secured by means of a nut 25 and bolt 27. However, any type of pivot, such as a pin-type pivot or arcuate-type pivot may be used to connect the lever handle 14 to the support member 12. The lever handle 14 has two ends, a pivot connection end 28 and an opposing pop-off wire connector end 26. The pivot connection end 28 of the lever handle 14 has a hole through which the pivot 24 is used to secure the lever handle 14 to the support member 12. The pop-off wire connector 26 of the lever handle 14 secures the pop-off wire 18 to the lever handle 14. The pop-off wire 18 may be connected to the pop-off wire connector 26 by means of a knot 29 tied in one end of the pop-off wire 18 or other connecting means such as a tie, hold down, coupling, or other similar device. The pop-off wire 18 is further secured to the pop-off wire connector 26 by threading the pop-off wire 18 through a hole 31 in the lever handle 14. Preferably, more than one pop-off wire 18 may be secured to the pop-off wire connector 26 of the lever handle 14. The need for several pop-off wires 18 is due to the fact that the snap-mount faucet handles come in a variety of shapes and sizes, with a variety of retaining hub dimensions and a variety of different sized caps between the faucet base and the faucet handle. The preferred pop-off wires 18 have a length between 8 and 9 inches, and a gauge between approximately 10 to 12. Of course, it is well recognized that wires of various lengths and gauges may be used depending on the type of faucet handle at issue. Thus, the user of the tool 10 may find it advantageous to have several pop-off wires 18 of various diameters and lengths secured to the lever handle 14 at the pop-off wire connector 26. The pop-off wires 18 may be made of any non-abrasive material, but preferably is made of a copper or aluminum core with a plastic coating surrounding the core.

The pop-off wire 18 has two ends. The first end is connected to the lever handle 14 at the pop-off wire connection 26. The opposing end of the pop-off wire 18 may be releasably secured to the support coupling 22 of the support member 12. Preferably, the pop-off wire 18 is releasably secured to the support coupling 22 to permit the various sized pop-off wires 18 to be secured to the support arm 20 of the support member 12 in order to accommodate various shaped snap-mount faucet handles.

Figure 4:
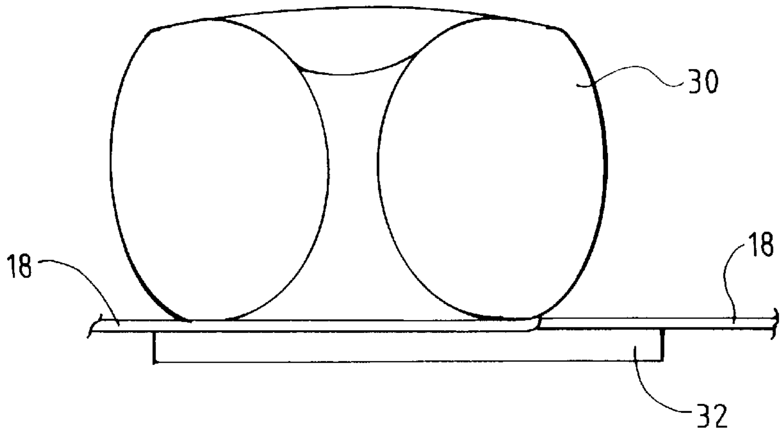
FIG. 4 is a partial perspective view of the handle in operation.

The operation of the snap-mount faucet handle removal tool 10 is described below. To use the snap-mount faucet handle removal tool 10, the user must first select the desired pop-off wire 18 to accommodate the particular faucet handle to be removed. The support end 28 of the selected pop-off wire 18 is coupled with the support coupling 22 of the support member 12. The secured pop-off wire 18 is then looped around the base of the faucet handle 30 as shown in FIG. 4. Thus, the pop-off wire 18 is positioned in the gap between the faucet handle 30 and the faucet body 32. Next, the user positions his/her hand with his/her fingers along the lever handle 14 and his/her thumb and palm around the support handle 16. By applying pressure to the lever handle 14 to pull the lever handle 14 towards the support handle 16, the pop-off wire 18 becomes taught. The pop-off wire 18 enters the gap between the faucet handle 30 and the faucet body 32, thus, exerting a force between the faucet handle 30 and the faucet body 32 sufficient to overcome the friction between the retaining hub and the faucet handle 30.

While specific embodiments of the invention have been shown and described, it is to be understood that numerous changes and modifications may be made therein without departing from the scope, spirit and intent of the invention as set forth in the appended claims.

What is claimed is:

1. A snap-mount faucet handle removal tool comprising:

a support member having a wire-coupling end and a support handle end;

a lever handle having a pivot coupling end and a wire connector end, and being joined to said support member between said support handle end and said wire coupling end at said pivot coupling end;

a pop-off wire having a release end and a secured end whereby said secured end is fastened to said wire connector end of said lever handle, and said release end is fastened to said wire-coupling end of said support member;

said pop-off wire being of sufficient length to encircle a snap-mount faucet handle and enter the gap between the faucet handle and a faucet body to separate said snap-mount faucet handle from a retaining hub when a force is applied to said lever handle.

2. The snap-mount faucet handle removal tool of claim 1 wherein said support member is generally C-shaped.

3. The snap-mount faucet handle removal tool of claims 1 or 2 further comprising a plurality of said pop-off wires that are adapted to be removably affixed to said wire connector end of said lever handle, said plurality of pop-off wires being of varying lengths and/or gauges to accommodate various sized snap-mount faucet handles.

4. The snap-mount faucet handle removal tool of claim 3 wherein said pop-off wires each have a non-abrasive coating.

5. The snap-mount faucet handle removal tool of claim 3 wherein said wire-coupling portion is hook-shaped such that it can be received within a loop in said pop-off wires.

6. The snap-mount faucet handle tool of claim 3 wherein said pop-off wire has a length between about 6 to 12 inches and a gauge of between about 6 to 15.

7. A snap-mounted faucet handle removal tool for removing a faucet handle from a faucet body comprising:

a support having a handle end and a pop-off coupling end;

a lever handle pivotally mounted to said support between said handle end and said pop-off coupling end;

a pop-off wire having a first end attached to said lever handle and a second end having attachment means adapted to be selectively attached to said pop-off wire coupling portion of said support, such that said pop-off wire can be looped at least once around said faucet handle and faucet body, whereby when said lever handle is pivoted, said loop in said pop-off wire is positioned in a gap between said faucet body and said faucet handle and, upon increasing tension, causes said faucet handle to separate from said faucet body.

8. The snap-mount faucet handle removal tool of claim 7 wherein said support member is generally C-shaped.

9. The snap-mount faucet handle removal tool of claims 7 or 8 further comprising a plurality of said pop-off wires that are adapted to be removably affixed to said wire connector end of said lever handle, said plurality of pop-off wires being of varying lengths and/or gauges to accommodate various sized snap-mount faucet handles.

10. The snap-mount faucet handle removal tool of claim 9 wherein said pop-off wires each have a non-abrasive coating.

11. The snap-mount faucet handle removal tool of claim 9 wherein said wire-coupling portion is hook-shaped such that it can be received within a loop in said pop-off wires.

12. The snap-mount faucet handle tool of claim 9 wherein said pop-off wire has a length between about 6 to 12 inches and a gauge of between about 6 to 15.

* * * * *